Dec. 6, 1966  D. F. RENZ ETAL  3,289,622
SUCTION FORCE COMPUTER CONTROLLER
Filed July 30, 1964  2 Sheets-Sheet 1
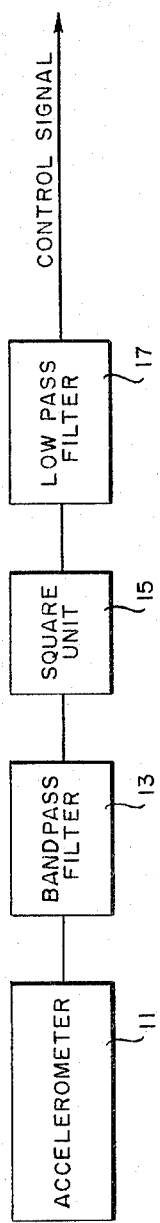
FIG. I.
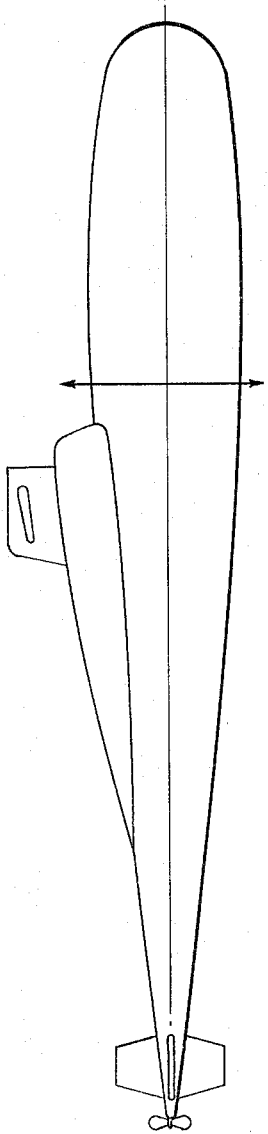
FIG. 2.
INVENTORS
DONALD F. RENZ
THOMAS L. MORAN
BY
ATTYS.

INVENTORS
DONALD F. RENZ
THOMAS L. MORAN
BY
ATTYS.

United States Patent Office 3,289,622
Patented Dec. 6, 1966

3,289,622
SUCTION FORCE COMPUTER CONTROLLER
Donald F. Renz, Montgomery County, Md., and Thomas L. Moran, Washington, D.C., assignors to the United States of America as represented by the Secretary of the Navy
Filed July 30, 1964, Ser. No. 386,464
9 Claims. (Cl. 114—16)

The invention described herein may be manufactured and used by or for the Government of the United States of America for governmental purposes without the payment of any royalties thereon or therefor.

This invention relates to a submarine depth control system and more particularly, to a surface wave measurement and anlyzing system for providing control signals for controlling submarine depth control equipment to enable the submarine to operate at shallow depths near a water surface agitated by waves.

A submarine near the surface of the water is vertically accelerated by two types of wave forces acting simultaneously on the submarine. First are randomly varying vertical oscillatory forces due to the surface waves that oscillate the submarine about some means depth. Second is a randomly varying suction force that tends to draw the submarine towards the surface.

It is well known that when the surface of the ocean is disturbed by waves, the resulting velocities of particles beneath the surface decrease with depth. The decay in velocity is exponential with the decay being more rapid for the shortest waves.

As a consequence when a submarine is operating near the surface of the water, the relative velocities of particles moving past the upper surface of the submarine are greater than particles moving past the lower surfaces. By Bernoulli's theorem, the fluid pressure at a given point decreases from the hydrostatic value by an amount proportional to the square of the particle velocity, so the net pressure decrease on the upper surfaces will be greater than that on the lower surfaces. Thus the submarine will experience a force, or "suction" tending to draw it to the surface. Generally, this suction force is from about $\frac{1}{10}$ to $\frac{1}{30}$ the force produced by surface wave action.

In the present invention advantage is taken of the fact that although this suction force is often so slight that its direct measurement is extremely difficult, the suction force has been observed to be approximately equal to the square of the amplitude of the surface wave acceleration multiplied by a suitable constant of proportionality. Thus, by directly measuring surface wave oscillatory forces, an envelope of values representing suction force can be obtained indirectly.

It is very crucial that a submarine not break surface since a portion of the submarine above water makes detection very easy and consequently makes the submarine vulnerable, to attack.

Present types of automatic control systems for maintaining a submarine at a fixed depth near the surface sense the motions of the submarine and on the basis of this information take corrective actions to keep the submarine at its ordered depth.

The prior art systems lack the ability to properly distinguish one type of motion from another. They are deficient in determining whether the submarine is merely oscillating or whether it is also being drawn to the surface under suction forces.

The prior art systems also give emphasis to controlling the rapid oscillatory motions of the submarine with the result that the main problem of keeping the submarine from being sucked to the surface is ignored.

It therefore is an object of this invention to provide the automatic control system of a submarine with information as to the nature and magnitude of the suction force that causes the submarine to be moved from its ordered depth.

Another object of this invention is to determine instantaneously if a suction force is acting on a submarine tending to draw it to the surface.

Yet another object of this invention is to make efficient use of the power available for controlling the depth of the submarine.

These and other objects and advantages will appear more clearly from the following specification in connection with the accompanying drawings, in which:

FIG. 1 is a circuit diagram, in block form, of the suction force computer controller according to the invention;

FIG. 2 is a view depicting a near surface submarine;

Figure 3:
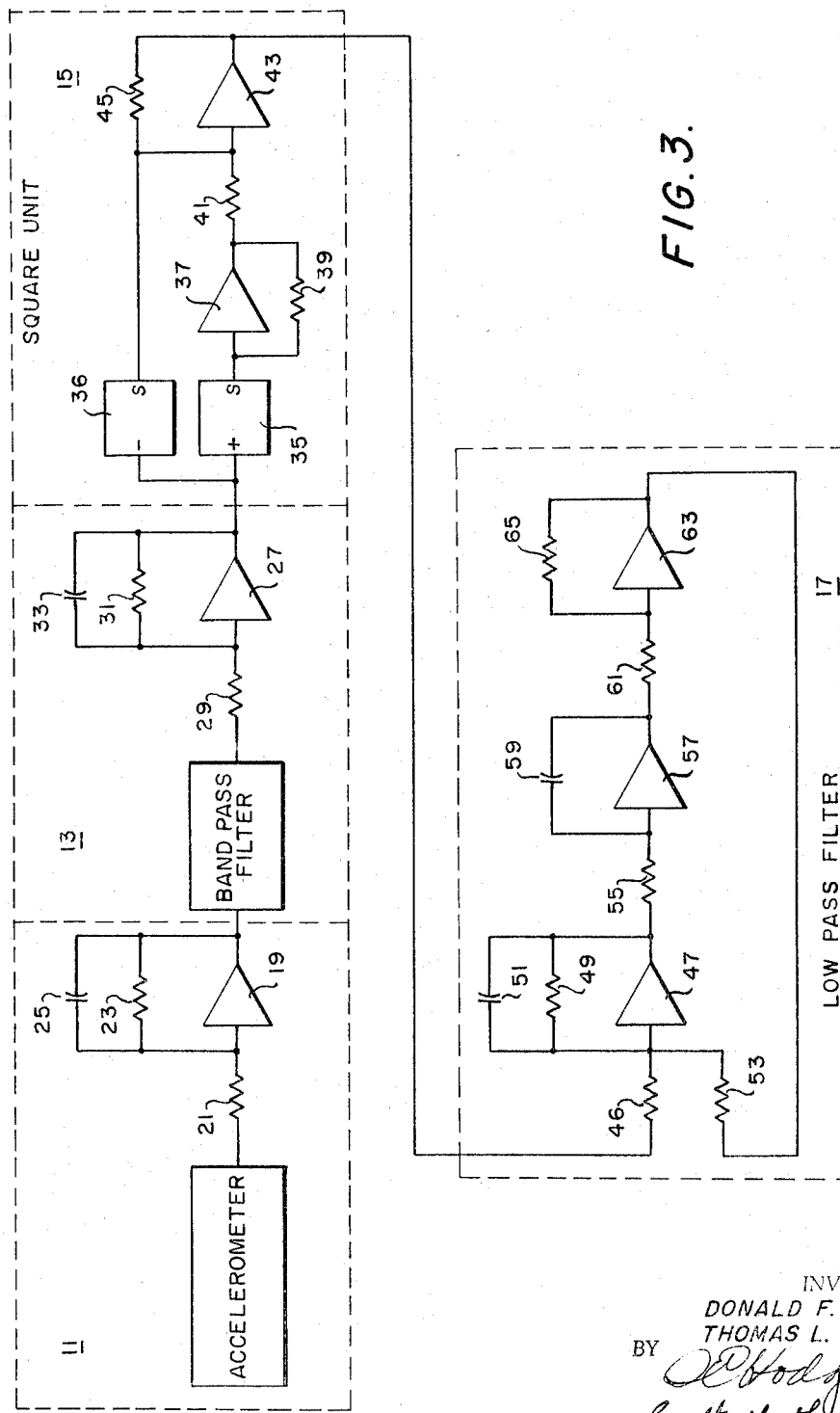
FIG. 3 is a more detailed circuit diagram of the block diagram shown in FIG. 1.

Referring now to the drawings, the suction force computer controller illustrated in FIG. 1 is composed of an accelerometer 11 that is placed in the interior of the submarine at the submarine's center of gravity. FIG. 2 illustrates the vertical and horizontal axes of the submarine with the two crossing at the center of gravity, the point at which the accelerometer is placed. Connected to the accelerometer is a band pass filter 13. The filter is connected to a squaring unit 15 of any suitable construction which in turn is in circuit with a low pass filter 17. The output of the low pass filter 17 is a control signal that is used to keep the submarine at its ordered depth by controlling planes, ballast pumping systems, hover jets or whichever type control system is used.

Referring to FIG. 3 there is shown an accelerometer 11. The output of the accelerometer 11 is connected through a resistor 21 to an amplifier 19. A resistor 23 and capacitor 25 are connected in parallel with the amplifier 19 and are in parallel with each other. The output from the amplifier is fed to a band pass filter 13. The band pass filter 13 is connected through a resistor 29 to an amplifier 27. A resistor 31 and capacitor 33 are connected in parallel with each other and with the amplifier 27. The output of the amplifier 27 is fed to the square unit 15 which algebraically squares the amplifier output signal. The square unit 15 comprises commercially available printed-circuit-carrying square cards 35 and 36. The positive side of square card 35 is connected to the negative side of square card 36 with the common junction point connected to the output of amplifier 27. The output of card 35 is fed to an amplifier 37 which is in parallel with a resistor 39 and the parallel combination is connected to one side of a resistor 41. The output of square card 36 is fed to the other side of the resistor 41. The junction of square card 36 and resistor 41 is connected through an amplifier 43 in parallel with a resistor 45. The junction point of the output of the amplifier 43 and resistor 45 is connected to a low pass filter 17. The low pass filter 17 comprises a resistor 46 connected to the parallel combination comprising an amplifier 47, resistance 49 and capacitor 51. The output of amplifier 47 is fed through a resistor 55 to an amplifier 57 which has a capacitor 59 in parallel with it. The lead from the amplifier 57 is connected to a resistance 61 which in turn is connected to an amplifier 63 having a resistance 65 in parallel therewith. A resistor 53 is connected between the input side of amplifier 47 and the output side of amplifier 63. The output of amplifier 63 is the control signal which is used to control the depth of the submarine.

As indicated seven amplifiers are used in the circuiti. For purposes of example only and not intending to be limited, the amplifiers used in one case were Philbrick Researches P65A solid state operational amplifiers. The band path filter used was a Krohn-Hite Corporation Model 330–A ultra-low frequency band pass filter. The band pass filter had outside limits of .02 cycle per second to 2,000 cycles per second. For illustrative purposes only the specific band path used in one example was .02 cycle per second to 2.0 cycles per second. An example of one accelerometer that may be used is the Kearfott Company, Inc., Model No. G2700–01A, called a Stabilized Vertical Accelerometer. The square card used was an Electronic Associates type 16.101 Dual X2 Diode Function Generator.

*Operation*

The operation of the suction force computer controller is as follows:

An accelerometer 11 placed at or near the submarine's center of gravity, as shown in FIG. 2, measures the vertical acceleration of the submarine. The vertical acceleration signal which is the output of the accelerometer 11 is fed to a band pass filter 13 which allows only the submarine vertical oscillatory acceleration signals produced by waves to pass, while blocking higher and lower frequencies. The vertical oscillatory acceleration signal from the band pass filter 13 goes to a square unit 15 where the positive portion of the signal is squared by square card 35 and the negative portion of the signal is squared by the square card 36. The square cards are printed circuits which square the amplitude of the received signal. The output of square card 35 is inverted by amplifier 37. The output of the square card 36 and amplifier 37, which are both negative, are added together and inverted to give a positive signal to the input of the low pass filter 17. The low pass filter 17 allows only the envelope of the squared signal to pass. The suction force is proportional to the envelope of the squared vertical oscillatory acceleration signal. The output signal from the low pass filter 17, which is proportional to the suction force acting on the submarine, is then converted to a control signal by proper gain adjustment and is then fed to an appropriate depth controlling system used by the submarine. The control signal orders the depth controlling system to put the submarine into a dive by an amount proportional to a magnitude of the suction force.

The following expression describes the characteristics of one form of the low pass filter 17:

$$\frac{Wn}{S^2 + 2\zeta WnS + Wn^2}$$

where $Wn$ is the natural frequency in radians per second, $S$ is the Laplace operator and $\zeta$ is the damping ratio. In one example $Wn$ is equal to .4 and $\zeta$ is equal to .7 which gives optimum damping.

Although a specific embodiment of the invention has been shown and described, it will be understood that it is intended to be merely illustrative and that various modifications may be made therein without departing from the scope and spirit of this invention as defined in the appended claims.

What is claimed is:

1. A suction force computer controller for controlling the depth of a submarine comprising:
   an accelerometer for producing a signal corresponding to vertical components of surface wave oscillation, said accelerometer being connected to a band pass filter;
   a square unit connected to the output of the said band pass filter; and
   the output of the said square unit connected to a low pass filter whereby the control output signal of the said low pass filter is adaptable for control of a depth controlling system of a submarine.

2. A suction force depth computer controlling system for a submarine comprising:
   means for measuring vertical acceleration of the submarine to provide a signal output corresponding thereto;
   said means being placed at the center of gravity of the submarine;
   means for allowing signals representing the submarine vertical accelerations produced by waves to pass wherein all other submarines accelerations are eliminated;
   means for squaring the signals representing the said vertical oscillatory accelerations; and
   means for allowing only the envelope of the signal representing the squared vertically oscillatory accelerations to pass;
   whereby suction force signals proportional to the envelope of the squared vertical oscillatory accelerations, are produced.

3. A system for overcoming suction force on a submarine and controlling the depth of the said submarine, comprising:
   a signal-producing accelerometer for measuring vertical oscillatory accelerations produced by surface wave action;
   a band pass filter connected to the output of the said accelerometer wherein only the signals representing the vertical oscillatory accelerations produced by waves are allowed to pass;
   means for algebraically squaring the output of the said band pass filter; and
   low pass filter means for passing only the envelope of the said squared band pass output whereby a measure of the suction force acting on the submarine is obtained;
   means responsive to the said output signal of said low pass filter for controlling the depth of a submarine.

4. A system according to claim 3 wherein the characteristics of the low pass filter are described by $$\frac{Wn}{S^2 + 2\zeta WnS + Wn^2}$$

where $Wn$ is the natural frequency in radians per second, $S$ is the Laplace Operator and $\zeta$ is the damping ratio.

5. A system according to claim 3 wherein the said squaring means is a dual X2 diode function generator for squaring the output of the said band pass filter.

6. A system for generating a submarine depth controlling signal comprising:
   an accelerometer for producing a signal representing the vertical acceleration;
   means for amplifying the accelerometer signal;
   band pass filter means for enabling the vertical oscillatory acceleration part of the signal produced by waves to pass while blocking the rest of the signal;
   means for amplifying the said vertical oscillatory acceleration signal;
   square unit for squaring the said vertical oscillatory acceleration signal; and
   low pass filter means for enabling the envelope of the said squared signal to pass while blocking the balance of the signal whereby the envelope of the squared vertical oscillatory acceleration signal is proportional to the suction force acting on the submarine.

7. A system according to claim 6 wherein the characteristics of the low pass filter means are described by the expression $$\frac{Wn}{S^2 + 2\zeta WnS + Wn^2}$$

where
$W_n$ is the natural frequency in radians per second, S is the Laplace Operator and $\zeta$ is the damping ratio.

8. A system according to claim 7 wherein the said square unit comprises a dual X2 diode function generator square card.

9. A system according to claim 6 wherein the square unit means comprises:
    means for squaring the positive and negative portions respectively of the signal from the band pass filter;
    means for inverting the squared positive signal; and
    means for adding together and inverting the two portions of the signal whereby the input to the low pass filter is positive.

References Cited by the Examiner
UNITED STATES PATENTS

| | | |
|---|---|---|
| 2,386,777 | 10/1945 | Bentley. |
| 2,972,972 | 2/1961 | Allen _____ 114—16 |
| 3,030,053 | 4/1962 | Smith et al. |
| 3,098,411 | 7/1963 | Fry. |
| 3,110,178 | 11/1963 | Marks et al. _____ 73—170 |

DAVID SCHONBERG, *Primary Examiner.*